United States Patent
Jung et al.

(10) Patent No.: US 9,264,107 B2
(45) Date of Patent: Feb. 16, 2016

(54) WIRELESS POWER TRANSMITTING DEVICE FOR WIRELESS POWER COMMUNICATION SYSTEM

(75) Inventors: Chun-Kil Jung, Seoul (KR); Yoon-Sang Kuk, Gwacheon-si (KR)

(73) Assignee: HANRIM POSTECH CO., LTD., Suwon-Si (KR)

( * ) Notice: Subject to any disclaimer, the term of this patent is extended or adjusted under 35 U.S.C. 154(b) by 800 days.

(21) Appl. No.: 13/550,147

(22) Filed: Jul. 16, 2012

(65) Prior Publication Data

US 2013/0015718 A1    Jan. 17, 2013

(30) Foreign Application Priority Data

Jul. 14, 2011   (KR) .......................... 10-2011-0069708

(51) Int. Cl.
| | |
|---|---|
| *H01F 27/42* | (2006.01) |
| *H01F 37/00* | (2006.01) |
| *H01F 38/00* | (2006.01) |
| *H04B 5/00* | (2006.01) |
| *H02J 5/00* | (2006.01) |

(52) U.S. Cl.
CPC .............. *H04B 5/0037* (2013.01); *H02J 5/005* (2013.01); *H04B 5/0087* (2013.01)

(58) Field of Classification Search
CPC .......... H02J 7/025; H02J 5/005; H02J 17/00; H01F 38/14; H01Q 1/38; H01Q 1/36; H01Q 1/24; H01Q 1/40; B60L 11/182
USPC ............ 307/104, 10.1, 106, 14, 9, 66, 64, 43, 307/39, 80, 82; 257/347, 382, 66; 438/151, 438/166, 149; 343/895, 700 MS, 702
See application file for complete search history.

(56) References Cited

U.S. PATENT DOCUMENTS

| | | | | |
|---|---|---|---|---|
| 7,727,823 | B2 * | 6/2010 | Jeong .................... | H01L 27/12 257/66 |
| 2005/0139924 | A1 * | 6/2005 | Kim ..................... | H01L 27/124 257/347 |
| 2007/0063920 | A1 * | 3/2007 | Shionoiri ................ | H01Q 9/27 343/895 |

(Continued)

FOREIGN PATENT DOCUMENTS

| | | |
|---|---|---|
| CN | 101304183 A | 11/2008 |
| CN | 101345327 A | 1/2009 |

(Continued)

OTHER PUBLICATIONS

Korean Office Action, Jul. 4, 2012, Issued in corresponding Korean Patent Application (KR 10-2011-0069708).

(Continued)

*Primary Examiner* — Rexford Barnie
*Assistant Examiner* — Jagdeep Dhillon
(74) *Attorney, Agent, or Firm* — Stein IP, LLC (57) ABSTRACT

A wireless power transmitting device for a wireless power communication system. The wireless power transmitting device includes: a circuit board including an insulating layer and a ground formed on the insulating layer; a core of a magnetic substance disposed on the circuit board to have a concave portion; a wire-wound coil accommodated in the concave portion to have one end for receiving a power through the circuit board and the other end connected to the ground; and a metal layer disposed between the core and the insulating layer to be connected to the ground.

14 Claims, 7 Drawing Sheets

(56) References Cited

U.S. PATENT DOCUMENTS

| | | | | |
|---|---|---|---|---|
| 2008/0224932 A1* | 9/2008 | Suematsu | G06F 1/1616 | 343/702 |
| 2009/0315786 A1* | 12/2009 | Ryou | H01Q 1/242 | 343/702 |
| 2011/0018360 A1* | 1/2011 | Baarman | H02J 5/005 | 307/104 |
| 2011/0068985 A1* | 3/2011 | Hillersborg | H01Q 9/0457 | 343/702 |
| 2011/0121913 A1* | 5/2011 | Satou | H01P 3/003 | 333/125 |
| 2012/0126165 A1* | 5/2012 | An | C04B 35/6261 | 252/62.58 |

FOREIGN PATENT DOCUMENTS

| | | |
|---|---|---|
| CN | 101919139 A | 12/2010 |
| JP | 2008-053675 | 3/2008 |
| KR | 10-0971705 | 7/2010 |

OTHER PUBLICATIONS

Chinese Office Action dated May 6, 2015, issued to Chinese Application No. 201210245620.2.

* cited by examiner

Rx_GND_ripple=±3Vpp
(a)

Rx_GND_ripple=±1Vpp
(b)

WIRELESS POWER TRANSMITTING DEVICE FOR WIRELESS POWER COMMUNICATION SYSTEM

CROSS-REFERENCE TO RELATED APPLICATION

This application claims the benefit of Korean Patent Application No. 10-2011-0069708, filed on Jul. 14, 2011 in the Korean Intellectual Property Office, the disclosure of which is incorporated herein by reference.

BACKGROUND OF THE INVENTION

1. Field of the Invention

The following description relates to a wireless power transmitting device used for a wireless power communication system.

2. Description of the Related Art

Generally, a rechargeable secondary battery is mounted on portable electronic devices such as a mobile communication terminal and Personal Digital Assistants (PDA). An individual charging device for supplying electric energy to a battery of a portable electronic device using commercial home power sources is required for charging the battery.

The charging device and the battery usually include an external contact terminal, respectively. The charging device and the battery are electrically connected by contacting the two contact terminals to each other. When the contact terminal is protruded to the outside, it ruins the beauty and there is a possibility that the contact terminal is contaminated by foreign substances to easily deteriorate the contact state. Also, when a short occurs in the battery due to user's carelessness or when the battery is exposed to moisture, charging energy may easily dissipate.

As an alternative of the contact charging method, a wireless power communication system for transmitting power wirelessly to charge a battery without contact between each contact terminal of the charging device and the battery is suggested.

SUMMARY OF THE INVENTION

While not limited thereto, an embodiment of the invention is directed to providing a wireless power transmitting device for a wireless power communication system that improves a signal reception sensitivity of a wireless power receiving device while improving a shielding property to a magnetic field.

According to an aspect of the invention, a wireless power transmitting device for a wireless power communication system, including: a circuit board including an insulating layer and a ground formed on the insulating layer; a core of a magnetic substance disposed on the circuit board to have a concave portion; a wire-wound coil accommodated in the concave portion to have one end for receiving a power through the circuit board and the other end connected to the ground; and a metal layer disposed between the core and the insulating layer to be connected to the ground.

According to an aspect of the invention, the metal layer may have an area corresponding to the core.

According to an aspect of the invention, the metal layer may be attached on the insulating layer of the circuit board.

According to an aspect of the invention, the metal layer may include copper.

According to an aspect of the invention, the metal layer may be a metal sheet disposed between the core and the circuit board.

According to an aspect of the invention, the metal sheet may include aluminum.

According to an aspect of the invention, the wireless power transmitting device may further include: a magnetic sheet disposed between the core and the metal layer.

According to an aspect of the invention, the metal layer may include a first metal layer attached on the insulating layer of the circuit board and a second metal layer disposed between the core and the first metal layer.

According to an aspect of the invention, the first metal layer may include copper and the second metal layer may include aluminum.

According to an aspect of the invention, the magnetic sheet may include nickel-zinc alloy.

According to an aspect of the invention, the core of the magnetic substance may include manganese-zinc alloy.

According to an aspect of the invention, the magnetic sheet may include: a first film and a second film; and a sintering layer disposed between the first film and the second film to be formed by sintering of the nickel-zinc alloy component.

According to an aspect of the invention, the sintering layer may be configured to be divided into a plurality of regions by grooves arranged in one or more directions.

According to an aspect of the invention, the coil may include a first coil and a second coil, which is partially overlapped with the first coil, and wherein the circuit board may control that power is supplied to any one of the first coil and the second coil to generate a wireless power signal.

According to an aspect of the invention, the plurality of extension grooves may be formed on a side wall defining the concave portion of the core, and wherein both ends of the coil may extend out of the core via the plurality of the extension grooves to be connected to the circuit board.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Reference will now be made in detail to the present embodiments of the present invention, examples of which are illustrated in the accompanying drawings, wherein like reference numerals refer to the like elements throughout. The embodiments are described below in order to explain the present invention by referring to the figures.

Hereinafter, a wireless power transmitting device for a wireless power communication system will be described in detail with reference to the accompanying drawings. In all embodiments of this specification, the same or similar constituent elements have the same or similar reference number and the same description on the same or similar constituent elements in different exemplary embodiments will be identically applied.

Figure 1:
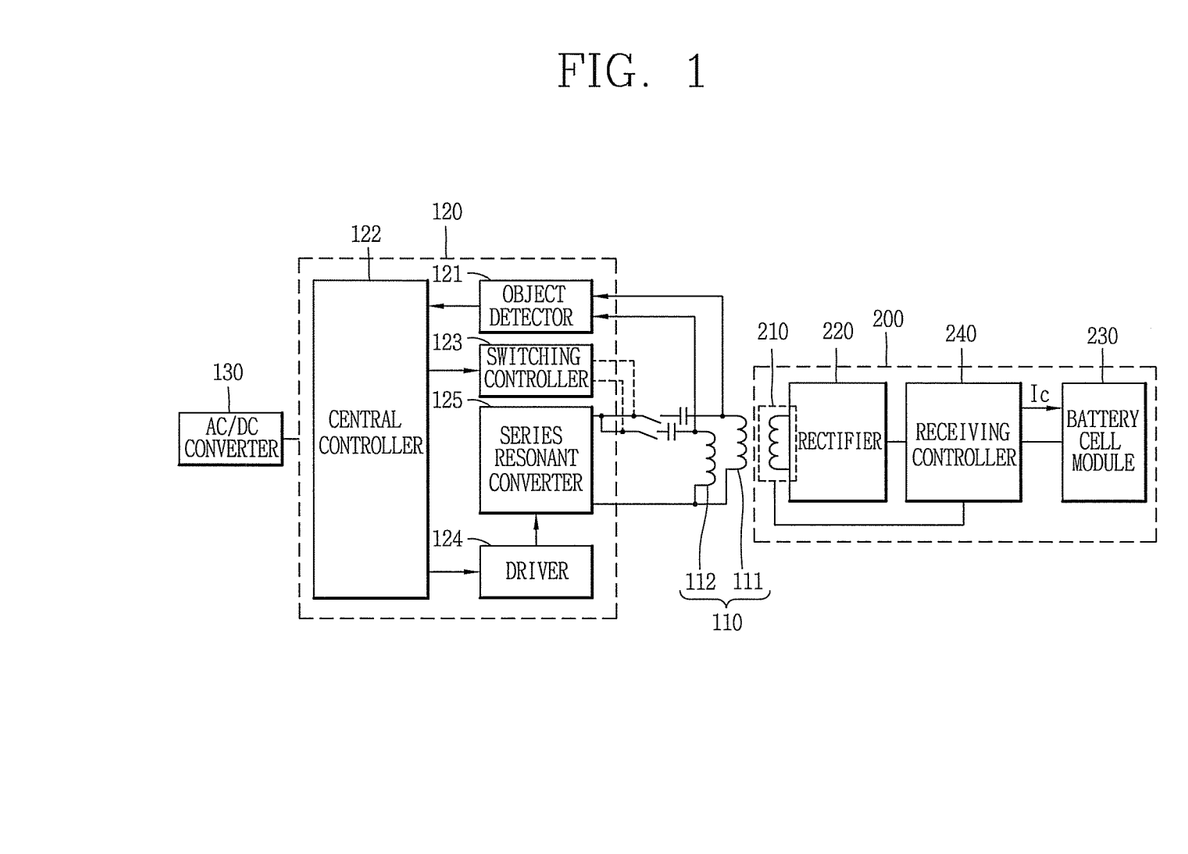
FIG. 1 is a block diagram that schematically shows a wireless power communication system in accordance with an exemplary embodiment.

FIG. 1 is a block diagram that schematically shows a wireless power communication system in accordance with an exemplary embodiment. As shown, the wireless power communication system in accordance with an exemplary embodiment includes a wireless power transmitting device 100 and a wireless power receiving device 200. According to an electromagnetic induction method, when the wireless power transmitting device 100 transmits a wireless power signal to the wireless power receiving device 200, the wireless power receiving device 200 receiving the wireless power signal charges a battery with the power of the wireless power signal or supplies power to electronic devices connected to the wireless power receiving device 200.

Hereinafter, each of configurations of the wireless power transmitting device 100 and the wireless power receiving device 200 will be described.

The wireless power transmitting device 100 according to an exemplary embodiment includes a primary coil 110, a transmitting controller 120 and an alternating current/direct current (AC/DC) converter 130. The primary coil 110 is a device for transmitting a power signal to a secondary coil 210 of the wireless power receiving device 200 according to the electromagnetic induction method. According to this exemplary embodiment, two coils including a first coil 111 and a second coil 112 may be applied as the primary coil 110.

With reference to FIG. 1 again, the transmission controller 120 for controlling the primary coil 110 may include an object detector 121, a central controller 122, a switching controller 123, a driver 124 and a series resonant converter 125.

The object detector 121 detects a load change of the primary coil 110, determines whether an object detected by the corresponding load change is the wireless power receiving apparatus 200—i.e., functions as an identification (ID) checker—and filters and processes a charging state signal transmitted from the wireless power receiving apparatus 200. For example, when an ID signal as a response signal to an ID call signal transmitted via the primary coil 110 is received, the object detecting unit 121 filters and processes the ID signal. When a charging state signal including information on a battery cell or a charging voltage is received, the object detecting unit 121 filters and processes the received information.

The central controller 122 receives and checks a determination result of the object detector 121, analyzes an ID signal received via the primary coil 110, and transmits a power signal for transmitting a wireless power signal via the primary coil 110 to the driver 124. Also, when the charging state signal is received via the primary coil to be described below, the central controller 122 changes the wireless power signal by controlling the driver 124 based on the charging state signal.

The switching controller 123 controls switching operation of a switch between the first coil 111 and the second coil 112 and the series resonant converter 125. In the present embodiment, two sub coils are used but the present invention is not limited thereto. The present invention includes a case that one coil is used. When one coil is used, the switching controller 123 is not needed.

The driver 124 controls the operation of the series resonant converter 125 by controlling the central controller 122.

The series resonant converter 125 generates transmission power for generating a power signal to be transmitted by controlling the driver 124 and supplies the transmission power to one end of the primary coil 110. In other words, when the central controller 122 transmits the power controlling signal for transmitting a power signal with a required power value to the driver 124, the driver 124 controls the operation of the series resonant converter 125 correspondingly to the transmitted power controlling signal. Also, the series resonant converter 125 applies transmission power corresponding to the required power value to the primary coil 110 by controlling the driver 124 to transmit a wireless power signal with a required strength. The other end portion of the primary coil 110 is grounded to a system ground 171.

In addition, the series resonant converter 125 supplies power for generating a first object detecting signal and a second object detecting signal via each of the first transmission coil 111 and the second transmission coil 112 by controlling of the driver 124.

The AC/DC converter 130 is a device for converting an AC power of 220V or 110V into a DC power of a predetermined voltage. As described above, an output voltage value is changed by control of the central controller 122.

The wireless power receiving apparatus 200 receiving power by receiving a power signal includes a secondary coil 210, a rectifier 220, a battery cell module 230 and a receiving controller 240. The reception coil 210 generates induction power by the transmitted power signal. The rectifier 220 rectifies the induced power. The battery cell module 230 is charged with the rectified power. The receiving controller 240 controls the secondary coil 210, the rectifier 220, and the battery cell module.

The secondary coil 210 is configured to receive a wireless power signal transmitted from the primary coil 110 of the wireless power transmitting device 100.

The rectifier 220 rectifies a wireless power received from the secondary coil 210 into a DC voltage, and maintains a charging state with a charging voltage before start of the charging.

The battery cell module 230 is an object to be charged by the DC power from the rectifier 220 according to the control of the receiving controller 240. Electronic appliances such as PMP, MP3, and cellular phones may be charged instead of the battery cell module 230. Meanwhile, the battery cell module 230 is configured to include protection circuits such as an over voltage and over current preventing circuit and a temperature sensing circuit. Also, a charging management module for collecting and processing the information including the charging state of the battery cell is included.

The receiving controller 240 controls the current of the power charged in the rectifier 220 such that a proper current flows into the battery cell module 230. Hereinafter, the wireless power transmitting device 100 will be described in detail.

Figure 2:
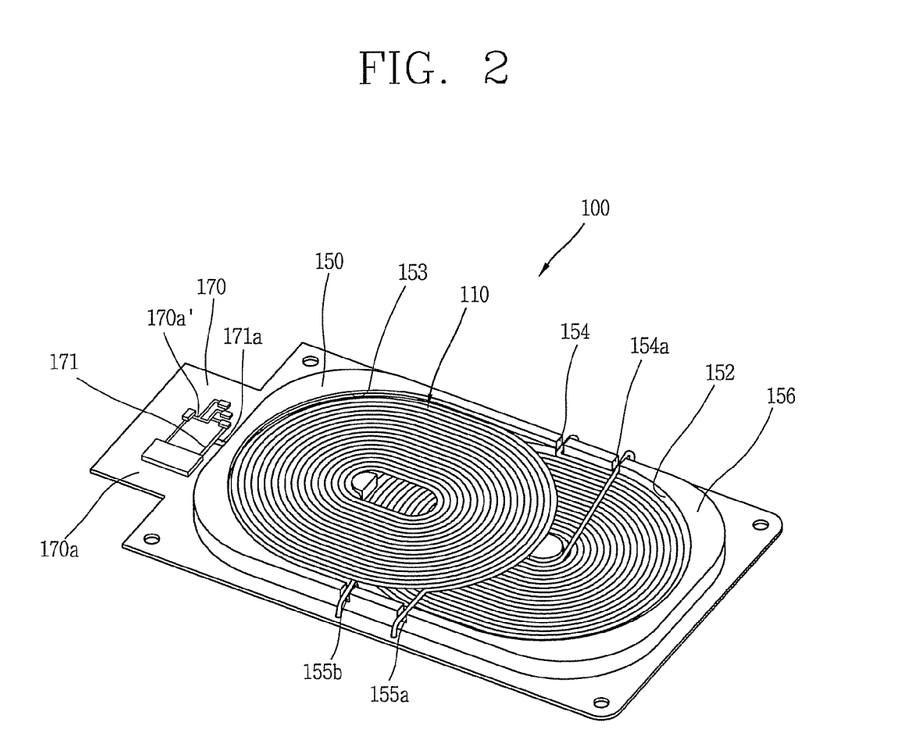
FIG. 2 is an assembled perspective view showing a wireless power transmitting device 100 in accordance with an exemplary embodiment.

FIG. 2 is an assembled perspective view showing the wireless power transmitting device 100 in accordance with an exemplary embodiment.

The wireless power transmitting device 100 in accordance with an exemplary embodiment includes a core assembly to be described below with reference to the drawings, and a housing covering the core assembly to form an outer shape.

The core assembly may include at least one coil 110, a plate-type core 150 and a circuit board 170.

The coil 110 has two free ends and is formed of a wound shape. The number of coils 110 may be one or more according to a method or a structure of the core. This exemplary embodiment adopts an easily understood configuration that two coils 110 are disposed to be partially overlapped. The disposition of the coils 110 will be described hereinafter.

The core 150 may be formed of a plate shape. This exemplary embodiment generally shows the rectangular parallelepiped core 150. To be specific, four corners of the rectangular parallelepiped shape are processed to be round. In a wide surface of the core 150, i.e., a front surface 151 (see FIG. 4) in main surfaces, concave portions 152 and 153 for accommodating the coil 110 are formed. The concave portions 152 and 153 are defined by a side wall 156 having a protruded shape to surround the concave portions 152 and 153. A plurality of the extension grooves 154a, 154b, 155a and 155b for connecting the concave portions 152 and 153 to an outside is formed at the side wall 156. Each of the end portions of the coil 110 is extended to the outside via the extension grooves 154a, 154b, 155a and 155b. The core 150 is formed of a magnetic substance. The core 150 shields a magnetic field, which is out of a direction toward the wireless power receiving device 200 (see FIG. 1), among the magnetic fields by a current flowing in the primary coil 110 accommodated in the concave portions 152 and 153.

Figure 4:
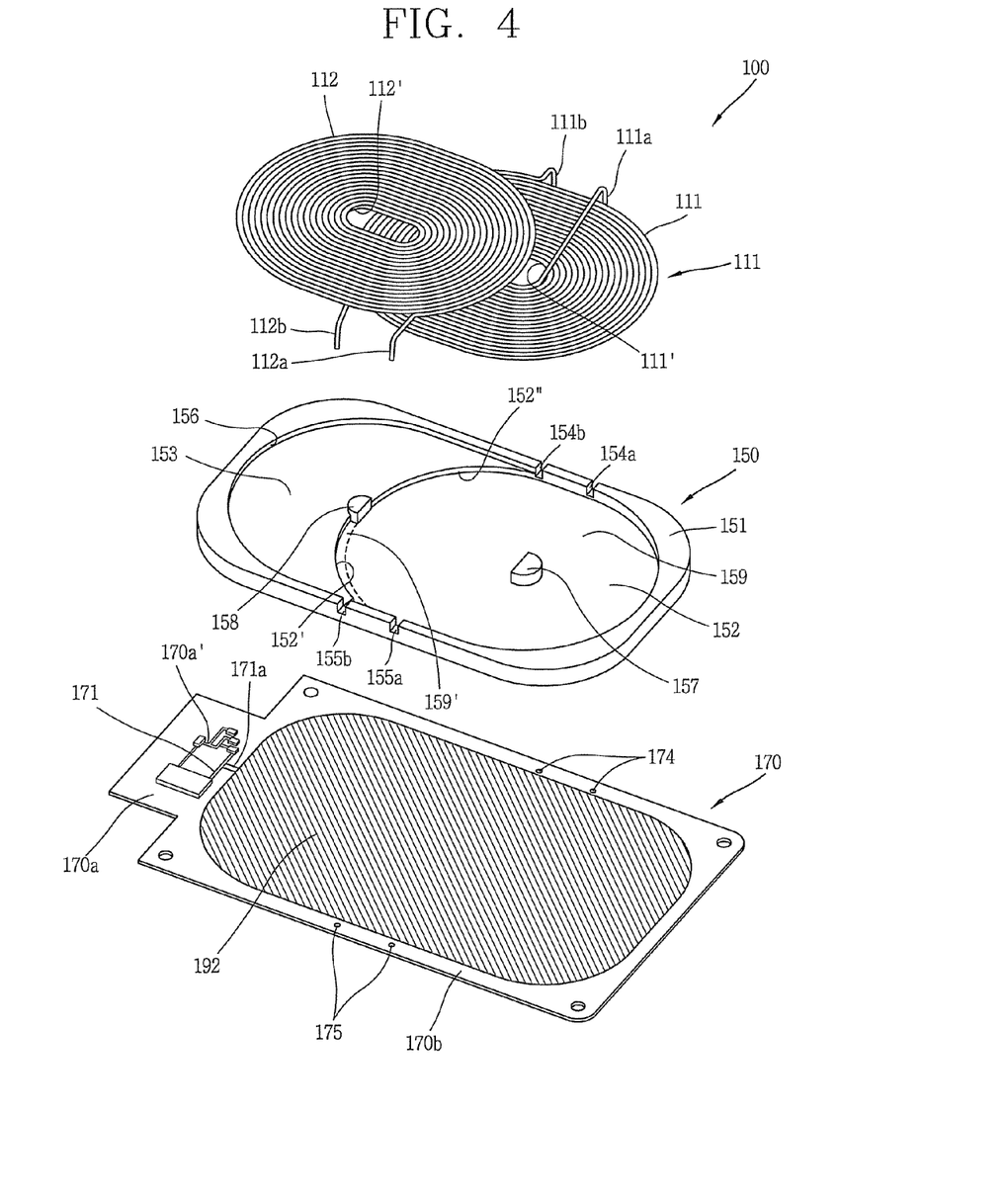
FIG. 4 is a disassembled perspective view showing the wireless power transmitting device 100 of FIG. 2.

The circuit board 170 is disposed at a lower side of the core 150 to face a rear surface of the core 150, which is the other surface of the front surface 151 of FIG. 4. Since an area of the circuit board 170 is larger than that of the core 150, a part of the circuit board 170 supports the core 150 from below.

An other part of the circuit board 170 includes a circuit for controlling whether power is to be applied to the coil 110. The control circuit includes the transmitting controller 120 of FIG. 1 described above.

Figure 3:
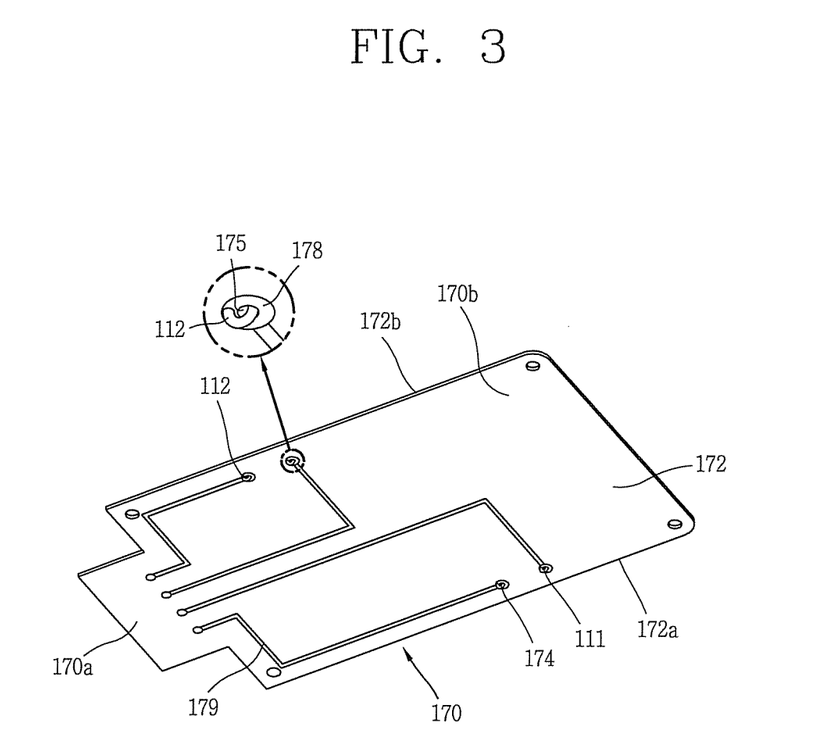
FIG. 3 is a assembled perspective view showing a rear side of the wireless power transmitting device 100 of FIG. 2.

FIG. 3 is an assembled perspective view showing a rear side of the wireless power transmitting device 100 of FIG. 2.

With reference to FIG. 3, each of both ends of the coil 110 is out of the core 150 (see FIG. 2) via the extension grooves 154a, 154b, 155a and 155b to penetrate the circuit board 170 and be extended. To be specific, both ends of the coil 110 penetrate the through-holes 174 and 175 formed on the circuit board 170. Each of both ends of the coil 110 is connected to connectors 178 formed to surround the through-holes 174 and 175 as shown in FIG. 3 and adjoins the through-holes 174 and 175. The through-holes 174 and 175 penetrate the circuit board 170 from an upper surface, which is an opposite surface of a lower surface 172, to the lower surface 172. The connectors 178 are formed on the lower surface 172.

A plurality of conductive circuits 179 are formed on the lower surface 172 of the circuit board 170. The conductive circuits 179 are configured to be extended from one portion 170b of the circuit board 170 to the other portion 170a. One connector 178 is connected to one conductive circuit 179. The transmitting controller 120 of FIG. 1 formed on the other portion 170a is electrically connected to the coil 110 to control the coil 110.

The circuit board 170 generally has a rectangular shape and includes a pair of long sides 172a and 172b. A pair of through-holes 174 is disposed at a lower region from a central line of the circuit board 170. The other pair of through-holes 175 is disposed at an upper region from a central line of the circuit board 170. In other words, a pair of thorough holes 174 is disposed to adjoin one long side 172a and the other pair of through-holes 174 is disposed to adjoin the other long side 172b. Accordingly, the conductive circuits 179 connected to the connectors 178 may be configured to be differentiated in different regions.

FIG. 4 is a disassembled perspective view showing the wireless power transmitting device 100 of FIG. 2.

With reference to FIG. 4, the coil 110 includes a pair of coils, i.e., the first coil 111 and the second coil 112.

The first coil 111 and the second coil 112 may have an oval shape. The oval shape may maximize the overlapped area of the first coil 111 and the second coil 112, and maximize a size of the overlapped first coil 111 and the second coil 112 in a length direction. The first coil 111 and the second coil 112 selectively receive power to be operated.

The first coil 111 and the second coil 112 may be wound generally to have the same outer size. Each of the first coil 111 and the second coil 112 may be wound to form one plane. The planes that the first coil 111 and the second coil 112 form may be disposed to be parallel to each other (see FIG. 2).

Each of the first coil 111 and the second coil 112 includes hollow portions 111' and 112' at a center thereof. An area of the hollow portions 111' and 112' is controlled according to winding levels of the first coil 111 and the second coil 112.

This exemplary embodiment shows a case that a hollow portion 111' of the first coil 111 is larger than a hollow portion 112' of the second coil 112. A meaning that the hollow portion 111' of the first coil 111 is larger than the hollow portion 112' of the second coil 112 is that the number of windings of the first coil 111 is smaller than that of the second coil 112. That is, since it affects an inductance of the first coil 111, resonant frequencies of the first coil 111 and the second coil 112 located in different heights become identical. Herein, the resonant frequencies relate to the inductance such that the resonant frequencies are inversely proportional to a square root of the inductance. When the resonant frequencies of the first coil 111 and the second coil 112 are identical, there is an advantage that it is easy to control the first coil 111 and the second coil 112.

As described above, the core 150 has a rectangular parallelepiped shape. The concave portions 152 and 153 accommodating the coil 110 is formed on the front surface 151 of the core 150. The concave portions 152 and 153 may include a first concave portion 152 recessed in a first depth and a second concave portion 153 recessed in a second depth. In this exemplary embodiment, the first coil 111 is accommodated in the first concave portion 152 and the second coil 112 is accommodated in the second concave portion 153. Since the first coil 111 is disposed at a position, which is lower than that of the second coil 112, the first depth is deeper than the second depth.

With reference to FIG. 4 again, the concave portions 152 and 153 are recessed to have a closed curve shape, i.e., an oval outline. If the entire concave portions 152 and 153 form a large outline of an oval shape, the first concave portion 152 forms an outline such as a small oval, which is inscribed inside the large oval. Accordingly, if the entire first concave portion 152 forms an intact oval shape, the second concave portion 153 generally has a crescent shape.

Contour walls 152' and 152" are formed on a portion that the first concave portion 152 meets the second concave portion 153. The contour walls 152' and 152" generally have a circular arc shape. A radius of the first contour wall 152' is configured to be larger than that of the second contour wall 152". One end portion 112*b* of the second coil 112 is disposed at a region 159' corresponding to a radius difference between the first contour wall 152' and the second contour wall 152". The end portion 112*b* passes by a lower portion that the second coil 112 is wound but does not pass by an upper portion. Accordingly, the entire thickness of the core assembly does not increase due to the end portion 112*b*. The above-mentioned region 159' may be recessed to have the same depth as the first concave portion 152.

The concave portions 152 and 153 may have a size corresponding to a degree that an outer peripheral of a coil assembly body formed by the first coil 111 and the second coil 112 is accommodated a little tightly. The first coil 111 and the second coil 112 may be maintained at a predetermined position inside the wireless power transmitting device 100 by being accommodated in the concave portions 152 and 153. The concave portions 152 and 153 include the side wall 156 and a bottom 159 according to shapes thereof.

The side wall 156 has a depth corresponding to the depth that the concave portions 152 and 153 are recessed. The side wall 156 has a size corresponding to the depth of the coil 110 to shield or lessen that the magnetic field generated in the coil 110 is leaked in a direction toward the side wall 156. As described above, an inner surface of the side wall 156 contacts an outer peripheral of the tightly accommodated coil 110 such that the coil 110 is disposed at a regular position. Also, the side wall 156 includes a plurality of extension grooves 154*a*, 154*b*, 155*a* and 155*b* for communicating the concave portions 152 and 153 with the outside. A pair of extension grooves 154*a* and 154*b* are formed at positions corresponding to both end portions 111*a* and 111*b* of the first coil 111. The other pair extension grooves 155*a* and 155*b* are formed at positions corresponding to end portions 112*a* and 112*b* of the second coil 112.

The supports 157 and 158 are formed to be protruded on the bottom 159 of the concave portions 152 and 153. Each of the supports 157 and 158 is inserted into the hollow portion 111' of the first coil 111 or the hollow portion 112' of the second coil 112. Accordingly, the supports 157 and 158 do not deviate from the position that the first coil 111 or the second coil 112 are set up, to thereby maintain the predetermined arrangement.

Shapes of the supports 157 and 158 correspond to the shapes of inner peripheral of the hollow portions 111' and 112' of the coil 110. In this exemplary embodiment, the outer peripheral of the supports 157 and 158 has a curved section corresponding to the inner peripheral surface of the hollow portions 111' and 112' having a curve shape. The other side of the curved section of the supports 157 and 158 may have a straight section to obtain a space for avoiding intervention with the outer peripheral of the coil 110. Accordingly, the supports 157 and 158 generally have a semi-circular cross-section to be an extended protrusion. A cross-sectional area of the first support 157 inserted into the first hollow portion 111' may be larger than that of the second support 158 inserted into the second hollow portion 112'. An upper surface 131 of the circuit board 170 is disposed to face a rear surface of the core 150, i.e., a rear surface of the front surface 151. The through-holes 174 and 175 corresponding to the extension grooves 154*a*, 154*b*, 155*a* and 155*b* are formed along the long sides 172*a* and 172*b* (see FIG. 3) of the circuit board 170.

According to the above-mentioned configuration, the first coil 111 is disposed at the first concave portion 152 in a state that the first support 157 is inserted into the hollow portion 111'. Similarly, the second coil 112 is disposed at the second concave portion 153 in a state that the second support 158 is inserted into the hollow portion 112'. Accordingly, the first coil 111 and the second coil 112 are partially overlapped.

Each of both end portions 111*a* and 111*b* of the first coil 111 is extended out of the core 150 via the extension grooves 154*a* and 154*b* to be inserted into the thorough hole 174 and connected to the connectors 178 (see FIG. 3) surrounding the thorough hole 174. One end portion 111*a* of the first coil 111 is extended over a rest wound portion of the first coil 111. However, since the depth of the first concave portion 152 is larger than that of the second concave portion 153, the entire depth of the core assembly does not increase. The other end portion 111*b* is extended to the extension groove 154*b* in parallel at an edge of the wound portion of the coil.

Each of both end portions 112*a* and 112*b* of the second coil 112 is extended out of the core 150 via the extension grooves 155*a* and 155*b* to be inserted into the thorough hole 175 and connected to the connector 178 surrounding the thorough hole 175. One end portion 112*a* of the second coil 112 is extended to the extension grooves 155*a* in parallel at an edged of the wound portion of the coil. Also, the other end portion 112*b* is extended to be overlapped with the wound portion of the coil 112. However, since the other end portion 112*b* is extended via the region 159', which is recessed to have the same depth as the first concave portion 152, and goes outside via the extension groove 155*b*, the entire thickness of the core assembly does not increase.

As described above, since the coil 110 is disposed at the concave portions 152 and 153 and their end portions 111*a*, 111*b*, 112*a* and 112*b* are extended to the outer side of the side wall 156 via the extension grooves 154*a*, 154*b*, 155*a* and 155*b*, it is possible to minimize the leakage of a magnetic flux generated in the coil 110. A metal layer 192 may be installed between an insulating layer 173 (FIG. 6) of the circuit board 170 and the core 150 to additionally lessen the leakage of the magnetic flux generated in the core 150. Also, an insulating film (not shown) may be further configured between the metal layer 192 and the core 150 according to the implementing environment of those skilled in the art and design options.

The metal layer 192 reduces the leakage of the magnetic flux in a direction toward the circuit board 170 in the core 150 by repulsing or absorbing the magnetic field. The metal layer 192 may be attached to the insulating layer 173 (FIG. 6) of the circuit board 170. In this case, since the metal layer 192 may be formed with a process for forming a conductive circuit 170*a*', it is preferred in view of simplification of the process. Also, since the metal layer 192 may be formed of a material such as the conductive circuit 170*a*' including copper, the further simplification of the process is possible. To be specific, the conductive circuit 170*a*' may be formed with the metal layer 192 by removing a portion, in which the conductive circuit 170*a*' and the metal layer 192 are excluded, via an etching process in a state that a copper sheet is attached to the insulating layer 173. However, the above description does not limit the substance of the metal layer 192, which may be formed of metals such as aluminum instead of copper.

It will be efficient that the metal layer 192 has an area corresponding to an area of the core 150 to shield the leakage flux. This exemplary embodiment shows a case that the area of the metal layer 192 is the same as the core 150.

Although the shielding efficiency of the magnetic flux leakage may increase by adding the metal layer 192, a first parasitic capacitor is created between the secondary coil 210 (see FIG. 1) of the wireless power receiving device 200 and the primary the coil 110 in a common mode. Also, a second parasitic capacitor is created between the core 150 and the metal layer 192. Through these parasitic capacitors, a switching noise generated when a sine wave is generated by alternating currents in the wireless power transmitting device 100 affects the wireless power receiving device 200. Accordingly, an oscillation is generated in a ground of the wireless power receiving device 200 and a coupling noise by the common mode voltage generates an electric field, thereby affecting a signal reception sensitivity of the wireless power receiving device 200.

In order to solve the above-mentioned problem, the system ground 171 is installed at a front surface of the circuit board 170. The ground 171 may be a part of the conductive circuit 170a'. The metal layer 192 as well as the coil 110 is grounded to the ground 17. The metal layer 192 may be grounded to the ground 171 at one point by a ground portion 171a. The ground 171 and the ground portion 171a may be configured with the conductive circuit 170a' and the metal layer 192 by a single process. Since an electric charge stored in the first and second parasitic capacitors moves to the ground by ground connection using the ground 171, the parasitic capacitors are removed.

As a result, it is possible to shield the magnetic flux leakage by the metal layer 192, and to lower a possibility that the signal reception sensitivity of the receiving device 200 is affected.

Figure 5:
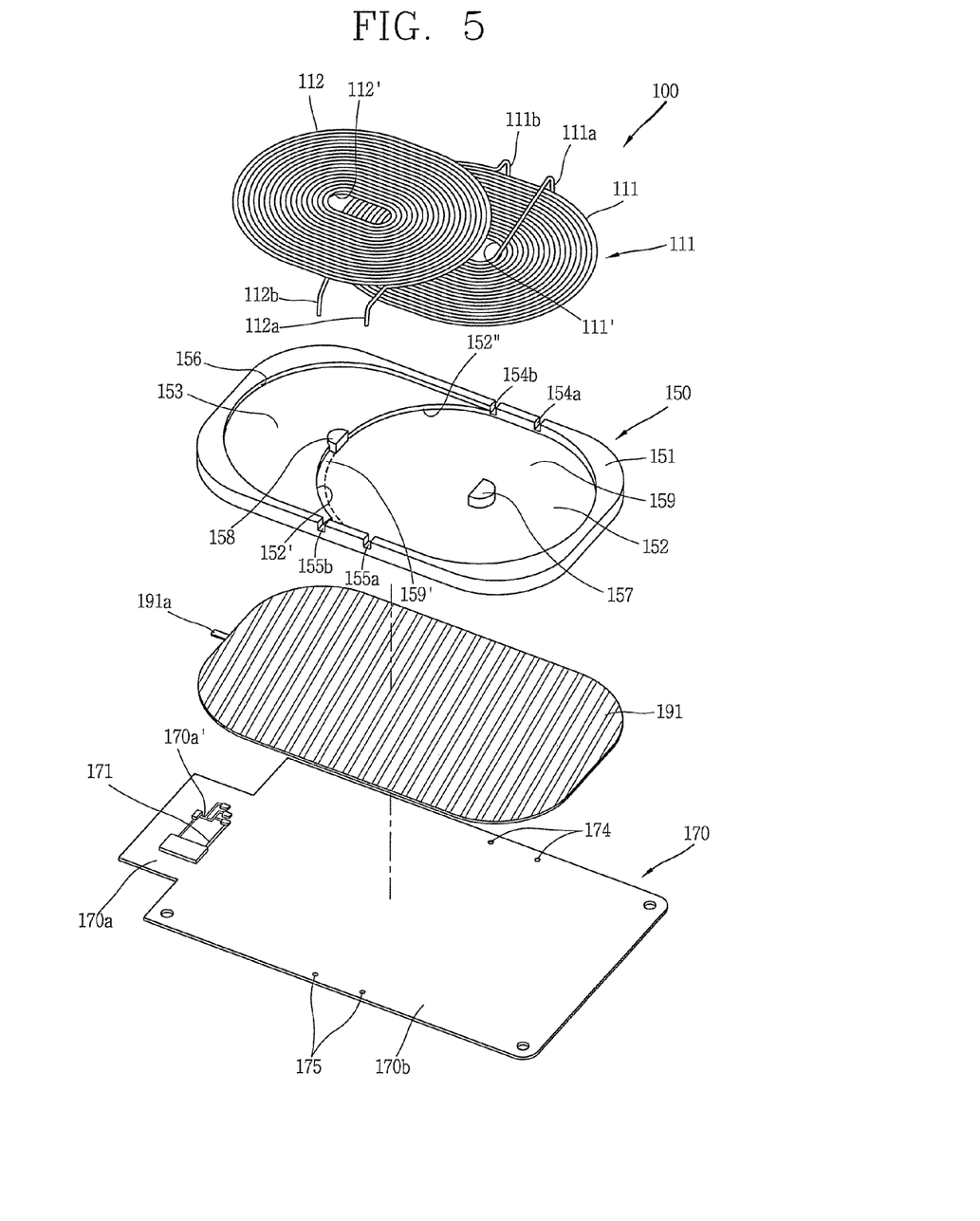
FIG. 5 is a disassembled perspective view showing the wireless power transmitting device 100' in accordance with another exemplary embodiment.

Hereinafter, the wireless power transmitting device 100' in accordance with another exemplary embodiment will be described. FIG. 5 is a disassembled perspective view showing the wireless power transmitting device 100' in accordance with another exemplary embodiment.

With reference to FIG. 5, the wireless power transmitting device 100' in accordance with another exemplary embodiment is generally similar to the wireless power transmitting device 100 in accordance with the above-mentioned exemplary embodiment. However, there is a difference that the wireless power transmitting device 100' in accordance with another exemplary embodiment includes a metal sheet 191 separately from the circuit board 170 as a metal sheet having a different format from the metal layer 192 (FIG. 4).

Accordingly, the circuit board 170 includes the ground 171 but does not include the metal layer 192 of FIG. 4 in accordance with the above-mentioned exemplary embodiment. The circuit board 170 includes an insulating layer at a position of the metal layer 192.

Since the metal sheet 191 is prepared individually from a conductive circuit of the circuit board 170, the metal sheet 191 may be formed of a material different from that of the conductive circuit of the circuit board 170. For example, if the conductive circuit includes copper, the metal sheet 191 may include aluminum. Since aluminum has a feature that repulses the magnetic field, there is an advantage that the core 150, which has a low magnetic permeability in comparison with a case that the copper is used for the metal sheet, may be used. However, the above description does not limit the substance of the metal sheet 191, which may be formed of copper.

With reference to this drawing again, when a ground portion 191a is formed on the metal sheet 191 and is connected to the ground 171, the metal sheet 191 is grounded to the ground 171. As described in the above exemplary embodiment, the parasitic capacitors are removed by the ground connection.

Figure 6:
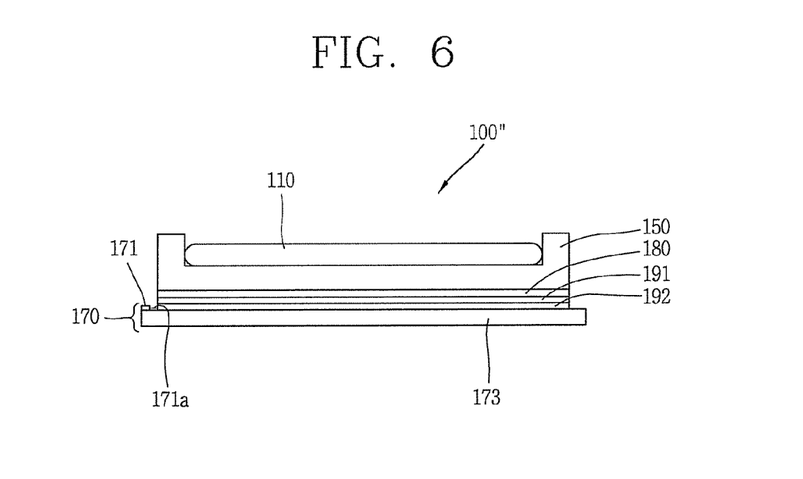
FIG. 6 is a longitudinal cross-sectional view of the wireless power transmitting device 100'' in accordance with still another exemplary embodiment.

The wireless power transmitting device 100" in accordance with still another exemplary embodiment will be described. FIG. 6 is a longitudinal cross-sectional view of the wireless power transmitting device 100" in accordance with still another exemplary embodiment.

With reference to FIG. 6, the wireless power transmitting device 100" may further include a magnetic sheet 180 as well as the coil 110, the core 150, the circuit board 170, the metal layers 191 and 192. Any one of the metal layers 191 and 192 may be selectively formed as described in the above exemplary embodiment.

In this exemplary embodiment, the metal layers 191 and 192 are classified into a first metal layer 191 and a second metal layer 192. The first metal layer 191 is a metal sheet described with reference to FIG. 5. As described with reference to FIG. 4, since the second metal layer 192 is formed to be attached to the insulating layer 173 of the circuit board 170, the second metal layer 192 may be considered to be a part of the circuit board. The second metal layer 192 is ground to the ground 171. As described in the above exemplary embodiment, the parasitic capacitors between the metal layers 191 and 192 and the magnetic sheet 180 (and the core 150) may be removed by the ground connection. The first metal layer 191 and the second metal layer 192 may be formed by being compressed or attached to each other using a conductive tape or an adhesive. The core 150 and the magnetic sheet 180 are also formed to be attached to each other by diverse methods. The magnetic sheet 180 and the first metal layer 191 may be attached to each other by diverse methods including the method using the conductive tape or the adhesive. As described above, each sheet may be individually prepared and assembled by the adhesive means to form the core assembly. Otherwise, a core assembly that the core 150, the magnetic sheet 180, the first metal layer 191, and the second metal layer 192 are formed integrally through a series producing process is also possible. The core assembly having the above-mentioned configuration does not generate another parasitic capacitor between the sheets with no regard to the producing method.

The magnetic sheet 180 improves an efficiency of the wireless power transmitting device 100" by compensating a magnetic permeability of the core 150. When the magnetic sheet 180 is introduced, the core 150 having a lower magnetic permeability in comparison with the case of the above exemplary embodiment. It means that a wide range of cores 150 may be selected.

Figure 7:
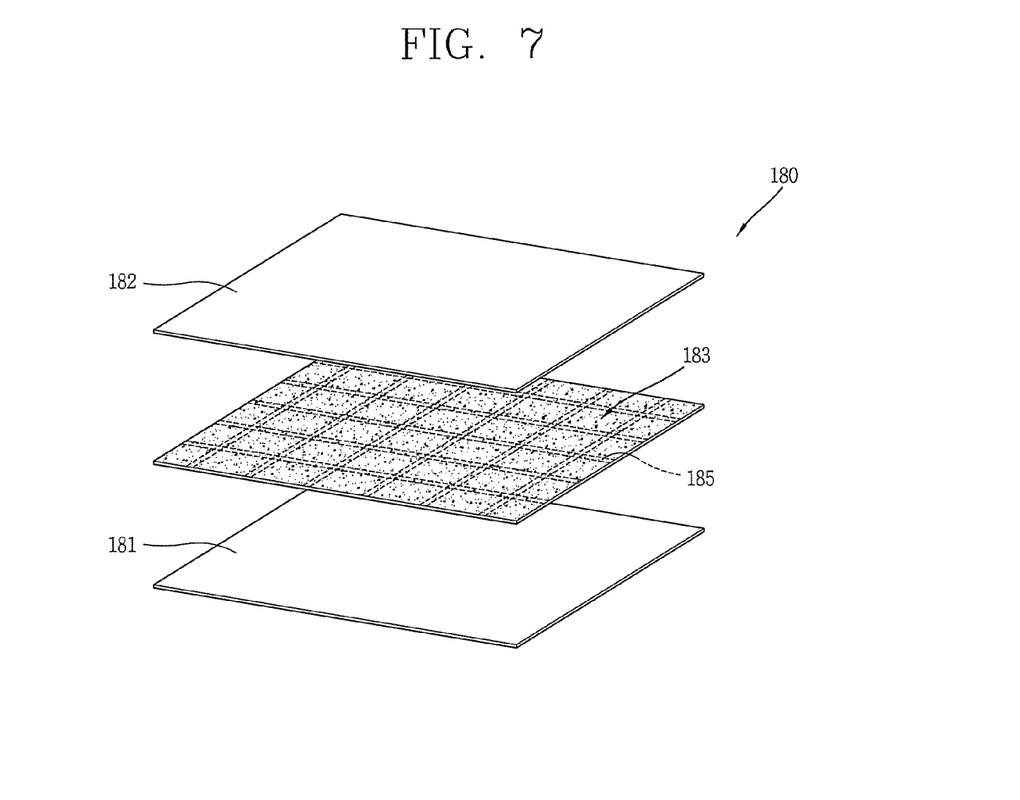
FIG. 7 is a disassembled perspective view showing a magnetic sheet 180 of FIG. 6.

A configuration of the magnetic sheet 180 will be described with reference to FIG. 7. FIG. 7 is a disassembled perspective view showing the magnetic sheet 180 of FIG. 6.

With reference to FIG. 7, the magnetic sheet 180 may include a first film 181, a second film 182, and a sintering layer 183 disposed between the first film 181 and the second film 182. The first and second films 181 and 182 may be formed of resin such as polyethylene (PE). The sintering layer 183 forms a layer by a sintered magnetic substance. A nickel-zinc alloy may be used as a magnetic substance. There are advantages that the nickel-zinc alloy may be processed to be thinner than the manganese-zinc alloy used for the core 150, and has a high magnetic permeability.

Grooves 185 arranged in one or more directions may be formed on the sintering layer 183. The sintering layer 183 is divided into a plurality of regions by the grooves 185. In this exemplary embodiment, the grooves 185 are arranged to generally form a grid pattern. The grooves 185 are formed according to the sintering of the sintering layer 183 after making cuts in a sintering body.

The magnetic sheet 180 may be bent within a predetermined range by the grooves 185 without damage of the sintering layer 183. Also, the grooves 185 may improve a current absorbing ability of the magnetic sheet 180 by widening an air gap and lower the magnetic permeability of the magnetic sheet 180 to a proper level.

Finally, an efficiency to reduce noise in the wireless power receiving device 200 by the wireless power transmitting device 100, 100', and 100" in accordance with the above exemplary embodiments will be described.

Figure 8:
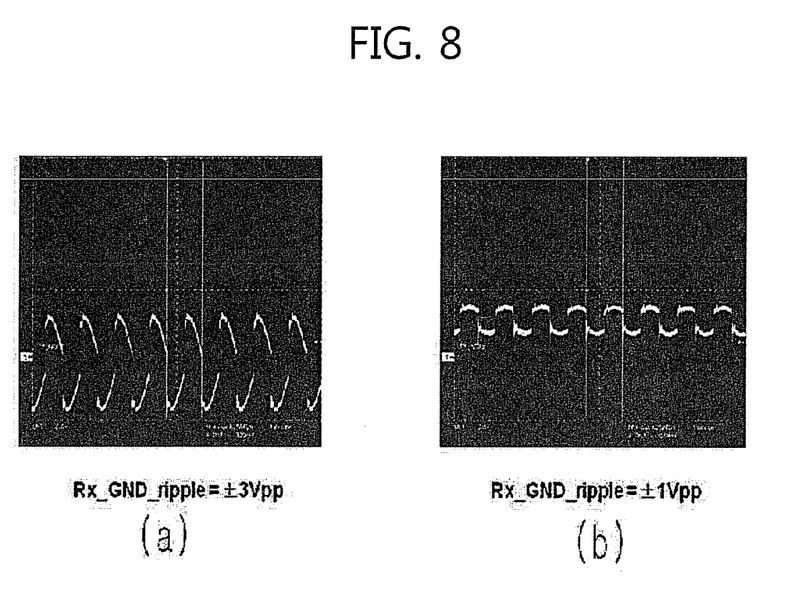
FIG. 8 is a graph showing noises measured in a ground of a wireless power receiving device 200 in accordance with an exemplary embodiment (b) compared with a conventional case (a).

FIG. 8 is a graph showing noises measured in a ground of the wireless power receiving device 200 in accordance with an exemplary embodiment (b) in comparison with a conventional case (a).

With reference to FIG. 8, in the conventional case (a), there is ±3 Vpp Ripple in the ground of the wireless power receiving device 200. In the case (b) of these exemplary embodiments, the value will be ±1 Vpp. Accordingly, when the wireless power transmitting device 100, 100' and 100" in accordance with these exemplary embodiments are used, it is possible to improve a shield efficiency of the leakage flux and reduce a noise level in a common mode of the wireless power receiving device 200 by one third. Also, it is expected that a receiving sensitivity of the wireless power receiving device 200 will be improved. Accordingly, as noises of a power circuit of the wireless power receiving device 200 are removed, a noise feature of a charging voltage to a target body such as a battery is improved, thereby reducing heat generation in the wireless power receiving device 200.

According to the wireless power transmitting device for wireless power communication system in accordance with the exemplary embodiment, a portion, which is not shielded by the core among the magnetic field generated while the coil transmits a wireless power signal, may be further shielded by the metal layer disposed between the insulating layer of the circuit board and the core.

Also, the noise generated in the wireless power receiving device by the switching operation of the wireless power transmitting device may be suppressed by removing the electric charge stored in the parasitic capacitor by grounding the coil and the metal layer.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A wireless power transmitting device for a wireless power communication system, comprising:
   a circuit board including an insulating layer and a ground formed on the insulating layer;
   a core of a magnetic substance disposed on the circuit board to have a concave portion;
   a wire-wound coil accommodated in the concave portion to have one end for receiving a power through the circuit board and the other end connected to the ground; and
   a metal layer disposed between the core and the insulating layer to be connected to the ground,
   wherein the coil includes a first coil and a second coil, which is partially overlapped with the first coil, and
   wherein the circuit board controls that power is supplied to any one of the first coil and the second coil to generate a wireless power signal.

2. The wireless power transmitting device of claim 1, wherein the metal layer has an area corresponding to the core.

3. The wireless power transmitting device of claim 2, wherein the metal layer is attached on the insulating layer of the circuit board.

4. The wireless power transmitting device of claim 3, wherein the metal layer includes copper.

5. The wireless power transmitting device of claim 2, wherein the metal layer is a metal sheet disposed between the core and the circuit board.

6. The wireless power transmitting device of claim 5, wherein the metal sheet includes aluminum.

7. The wireless power transmitting device of claim 1, further comprising:
   a magnetic sheet disposed between the core and the metal layer.

8. The wireless power transmitting device of claim 7, wherein the metal layer includes a first metal layer attached on the insulating layer of the circuit board and a second metal layer disposed between the core and the first metal layer.

9. The wireless power transmitting device of claim 8, wherein the first metal layer includes copper and the second metal layer includes aluminum.

10. The wireless power transmitting device of claim 7, wherein the magnetic sheet includes nickel-zinc alloy.

11. The wireless power transmitting device of claim 10, wherein the core of the magnetic substance includes manganese-zinc alloy.

12. The wireless power transmitting device of claim 10, wherein the magnetic sheet comprises:
   a first film and a second film; and
   a sintering layer disposed between the first film and the second film to be formed by sintering of the nickel-zinc alloy component.

13. The wireless power transmitting device of claim 12, wherein the sintering layer is configured to be divided into a plurality of regions by grooves arranged in one or more directions.

14. The wireless power transmitting device of claim 1, wherein a plurality of extension grooves are formed on a side wall defining the concave portion of the core, and
   wherein both ends of the coil extends out of the core via the plurality of the extension grooves to be connected to the circuit board.

* * * * *